United States Patent [19]
Griffith et al.

[11] 3,776,530
[45] Dec. 4, 1973

[54] ELECTRODIALYTIC DEMINERALIZING UNIT FOR HUMIDIFICATION PURPOSES

[75] Inventors: Jerry L. Griffith; Donald D. Kinsworthy, both of Dayton, Ohio

[73] Assignee: Lau Incorporated, Dayton, Ohio

[22] Filed: Mar. 25, 1971

[21] Appl. No.: 127,990

[52] U.S. Cl. .......... 261/4, 261/DIG. 46, 204/180 P, 204/301
[51] Int. Cl. .............................................. B01f 3/04
[58] Field of Search ..................... 261/4, DIG. 46; 204/180 P, 301

[56] References Cited
UNITED STATES PATENTS

| | | | |
|---|---|---|---|
| 3,291,117 | 12/1966 | Shenkin | 261/DIG. 46 |
| 2,777,814 | 1/1957 | Latham, Jr. | 204/301 |
| 2,731,411 | 1/1956 | Clarke | 204/301 |
| 2,921,005 | 1/1960 | Bodamer | 204/301 |
| 2,846,387 | 8/1958 | Stoddard | 204/180 P |
| 2,752,306 | 6/1956 | Juda et al. | 204/301 |

Primary Examiner—Tim R. Miles
Assistant Examiner—Steven H. Markowitz
Attorney—Marechal, Biebel, French & Bugg

[57] ABSTRACT

The unit includes at least one electrodialytic "half-cell" in which a single cation-selective membrane separates the cell into a product flow chamber and a purge flow chamber and in which an anode is disposed in the product flow chamber and a cathode is disposed in purge flow chamber. Tap water is demineralized when a electric potential is established between the electrodes which pulls the cation constituents of lime, principally calcium, magnesium and manganese, out of the product flow chamber through the cation-selective membrane and into the purge flow chamber. In the preferred embodiment, the demineralized product is delivered to a nozzle in the air plenum of a furnace for atomization and humidification of hot air passing therethrough.

1 Claim, 9 Drawing Figures

PATENTED DEC 4 1973 3,776,530

INVENTORS
JERRY L. GRIFFITH &
DONALD D. KINSWORTHY

BY
Marechal, Biebel, French & Bugg
ATTORNEYS

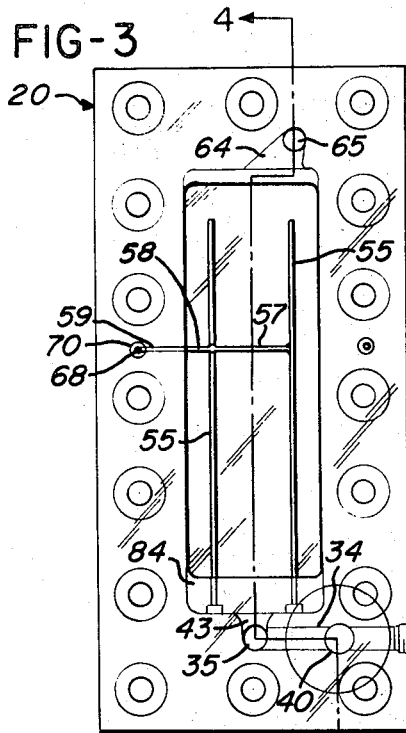
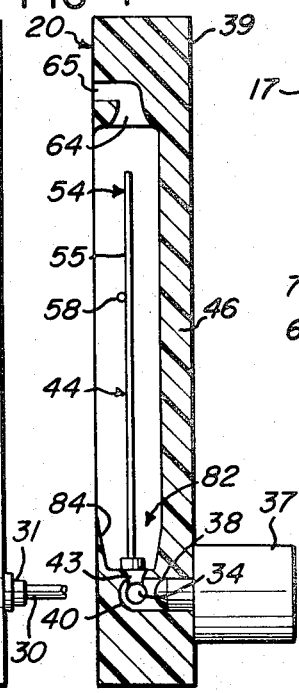
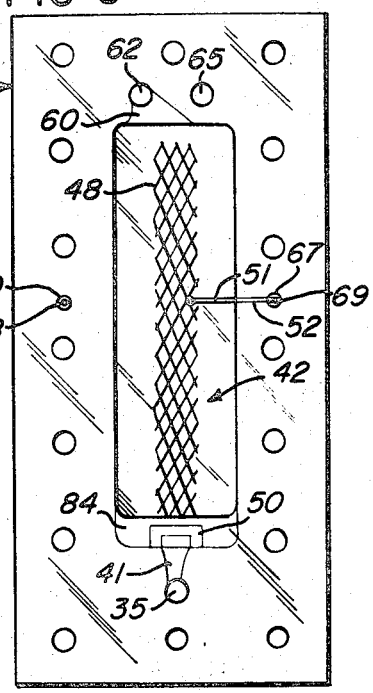
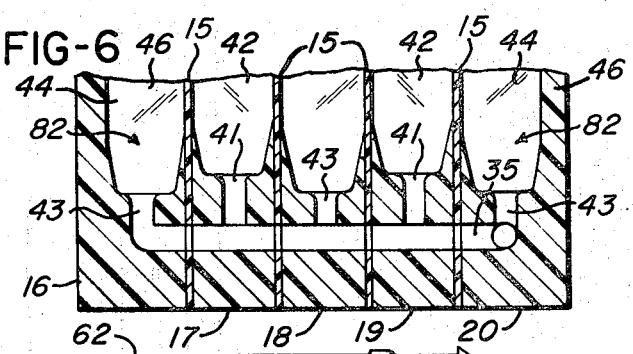
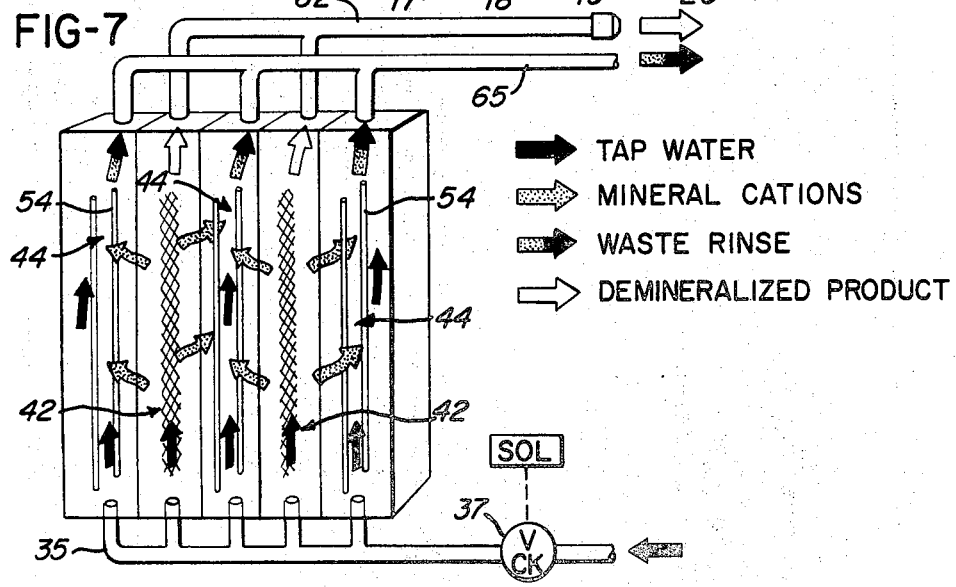

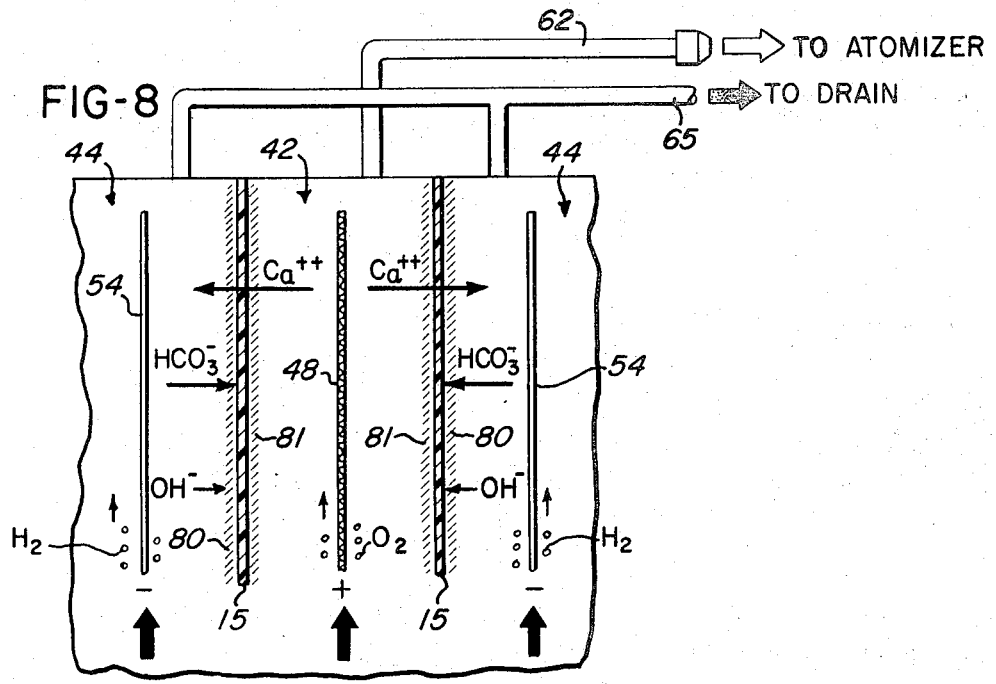
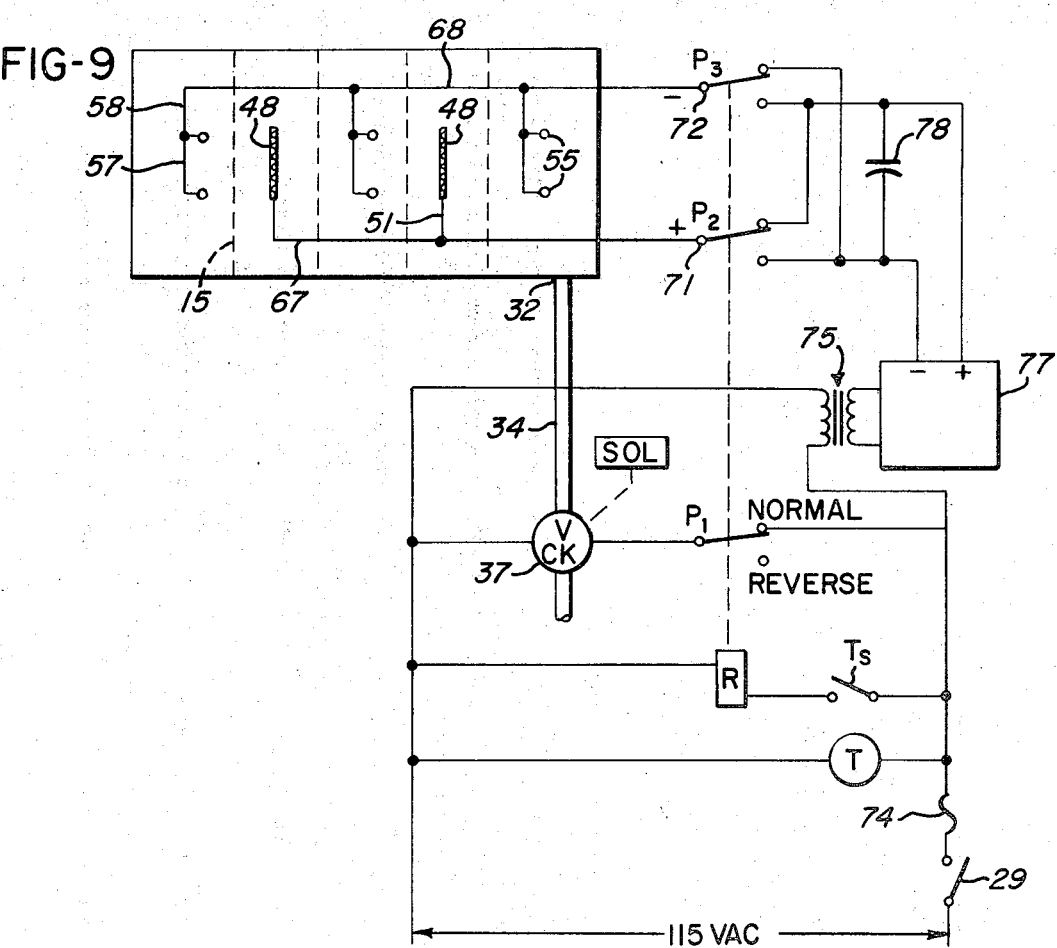

ELECTRODIALYTIC DEMINERALIZING UNIT FOR HUMIDIFICATION PURPOSES

BACKGROUND OF THE INVENTION

The presence of ordinary lime in tap water, principally in the form of calcium bicarbonate $Ca(HCO_3)_2$, has presented one of the most vexing problems in the humidification of air in hot air furnaces. In general practice, humidification of the air is accomplished by blowing hot air through a wetted porous air-water contact media, such as a sleeve of open cell polyurethane foam. The hot air carries the water molecules away from the surface of the media and continuously increases the concentration of lime in the remaining water on the media and in the water reservoir. When the saturation point is reached, "liming," or precipitation of lime, occurs, and a lime residue forms and remains on the media and the water reservoir, and eventually clogs the pores of the media. This creates the additional problem of periodic cleaning of the media, and also reduces the useful life of the humidifying apparatus.

Considerable effort and ingenuity has been expended in minimizing the effects of liming, such as periodically removing or purging the water reservoir and the like to reduce lime concentrations. See for example, U.S. Pat. Nos. 3,315,948 of 1967 and 3,456,927 of 1969, assigned to the same assignee as the present invention. It has become apparent, however, that such efforts do not attack the root of the problem, namely, the lime itself.

A particularly desirable method of humidification in a hot air furnace is the spraying of a water mist directly into the furnace plenum. However, when lime is present in the water, the individual water droplets carry with them the dissolved lime, and this is then conveyed throughout the home by the air circulating system and falls out as a powdery dust residue, thus presenting a troublesome cleaning problem. Further, the lime itself builds up and clogs the atomizing nozzles and has an adverse effect upon the interior walls of the furnace and ducting.

It is now evident that the solution to the liming problem is to remove the lime from the tap water before it is added to the air. However, aside from distillation, it appears that the removal of lime from water can also be accomplished by ionic transfer.

Ion exchange is one method of ionic transfer. For example, by a process akin to water softening, tap water may be passed through a bed of ion exchange resin which exchanges sodium ions for the calcium ions of lime. See U.S. Pat. No. 3,291,117 of 1966. This method has several significant draw-backs. One drawback is that the resins become exhausted, and must be regenerated or replaced from time to time. Another important drawback is that the ion exchange resins usually only exchange one type of an ion with a different type of ion, and do not effectively deionize or remove ions from the water.

SUMMARY OF THE INVENTION

The present invention relates to the art of removing lime from tap water by electrodialysis, and is particularly directed to an electrodialytic demineralizing unit for producing on a relative low-volume basis mineral-free water for humidification purposes. The unit is simple in construction and inexpensive to manufacture and is especially adapted to produce essentially lime-free water capable of being atomized and sprayed directly into the hot air plenum of a furnace or the like.

In general, the unit includes at least one electrodialytic "half-cell" in which an anode is disposed in a demineralized product flow chamber and a cathode is disposed in a waste purge flow chamber, and the product and purge chambers are separated by a single cation-selective membrane. Unlike conventional electrodialytic units, the cell of the present invention does not include an anion-selective membrane, and is therefore referred to herein as a "half-cell."

In a preferred embodiment, the unit includes four back-to-back "half-cells" and consists of a series of four cation-selective membranes interposed between a series of five rectangular polymer blocks having cavities therein forming two alternating product flow chambers and three alternating purge flow chambers. Tap water is delivered into the bottoms of the five chambers through a longitudinal passageway within the blocks, and a potential applied across the electrodes demineralizes the product streams by pulling the several cation constituents of lime through the cation-selective membranes and into the purge flow chambers. The product and the purge streams are delivered to separate longitudinal passageways at the tops of the five chambers, and the product stream is delivered directly to an atomizing nozzle within the furnace while the purge stream is delivered to a drain.

The single cation-selective membrane prevents the bicarbonate anion constituent of lime from passing into the product flow chamber, and consequently this anion constituent forms a thin acidic film on the cathode side of the membrane. This film prevents the calcium cations from joining with hydroxyl ions formed by electrolysis and from forming a deleterious scale on the surface of the membrane. The unit thus achieves longer service life than conventional electrodialytic units in which scaling forms on and deteriorates the membranes.

The purge streams carry away most of the calcium cations and most of a calcium carbonate precipitate which forms in the purge chambers by the combination of calcium cations and carbonate anions. Some precipitation of calcium carbonate does occur and this material is collected in deep collecting cavities formed at the base of each purge chamber, thereby lengthening the service life of the unit. In addition, precipitation is minimized by periodically reversing the potential across the electrodes and by forming the chambers and their inlets and outlets with smooth surfaces which prevent the development of stagnate precipitation seeding areas.

It is accordingly an important object of the invention to provide a furnace humidifier with an electrodialytic demineralizing system.

Another important object of the invention is the provision, in a humidifier, of one or more half-cell electrodialytic units for the production of essentially lime-free water on a relatively low-volume basis.

A further object of the invention is the provision of an electrodialytic deionizing system particularly adapted for use with a humidifier, as outlined above, which is characterized by a long service life, relatively low cost and freedom from frequent maintenence.

A still further object of the invention is the provision of a humidifier including an electrodialytic demineralizer unit in which precipitation of mineral salts is minimized.

These and other objects and advantages of the invention will become apparent from the following description, the accompanying drawings and the appended claims.

BRIEF DESCRIPTION OF THE DRAWINGS

FIG. 3 is a view of the end block on the right-hand side of FIG. 2 looking from left-to-right;

FIG. 4 is a sectional view taken along line 4—4 of FIG. 3;

FIG. 5 is a view of the second block from the left-hand side of FIG. 2, also looking from left-to-right.

FIG. 6 is a partially broken-away sectional view showing the configuration of the bottoms of the flow chambers;

FIG. 7 is a schematic flow-diagram for the unit of the present invention;

FIG. 8 is a schematic diagram showing movement of the ions and showing the films which form on the membranes; and FIG. 9 is a circuit diagram of the preferred electrical control system for the unit of the present invention.

CONVENTIONAL ELECTRODIALYSIS

Figure 1:
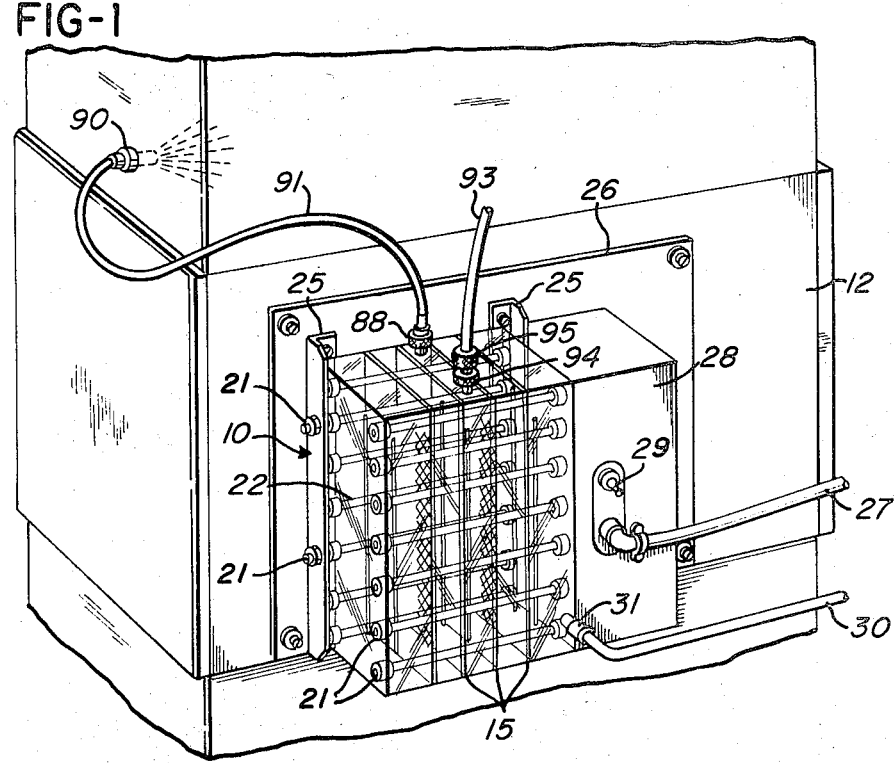
FIG. 1 is a perspective view of a demineralizing unit constructed according to the present invention.

In conventional electrodialytic demineralizers generally one or more three-compartment cells are used. A cathode is disposed in one end compartment formed by an anion-selective membrane and an anode is disposed in the opposite end compartment formed by an cation-selective membrane. The liquid to be demineralized is delivered to a central compartment, and an electric field applied across the electrodes causes anions to be drawn through the anion-selective membrane and cations to be drawn through the cation-selective membrane to effect demineralization. The anode and cathode compartments are continuously rinsed to carry the removed ions away. Multi-cell electrodialytic systems of this type are currently being used for the large scale desalination of seawaters and brackish waters, and are plagued by an interferring phenomena known as "concentration polarization."

When tap water is the liquid being desalted, the largest single dissolved component is calcium bicarbonate - $Ca(HCO_3)_2$. When subjected to an electric field, calcium bicarbonate splits into the positively charged calcium cation and the negatively charged bicarbonate anion, and the cathode draws the calcium cations in the central compartment through the cation-selective membrane and into the cathode rinsing compartment. At the same time, the calcium cations in the anode rinsing compartment are blocked from passing into the central compartment by the anion-selective membrane and form in a concentrated layer on the surface of the membrane. Concurrently, the bicarbonate anions in the central compartment are drawn through the anion-selective membrane by the anode, but those in the cathode rinsing compartment are blocked from passing into the central compartment by the cation-selective membrane and form a concentrated layer on the surface of the membrane.

The electric field also causes electrolysis to take place, and oxygen gas and positively charged hydronium ions form at the anode and hydrogen gas and negatively charged hydroxyl ions form at the cathode. The calcium ion, being the cation component of a strong base, calcium hydroxide, competes with the weaker hydronium ion for the hydroxyl ions in the cathode compartment. The bicarbonate ion is the anion component of a week acid, carbonic acid, and competes with the stronger hydroxyl ion for the hydronium ion in the anode compartment. The net effect of the ionic movement created by the field is that an alkaline condition develops in the cathode compartment and an acidic condition develops in the anode compartment, and the calcium cations moving through the cation-selective membrane combine with the hydroxyl anions in the cathode compartment and form a calcium hydroxide scale on the membrane which deteriorates and destroys the membrane.

The dissolved calcium bicarbonate $Ca(HCO_3)_2$ is also sensitive to a high pH, and as the hydroxyl concentration increases in the cathode compartment and develops an alkaline condition, hydroxyl ions strip the hydrogen ions from the bicarbonate anion $HCO_3$ to form water and a carbonate anion $CO_3$. This carbonate anion is insoluble and eventually combines with the calcium cation to form calcium carbonate $CaCO_3$ which precipitates out in large amounts and contaminates the cathode compartment. This is particularly troublesome because calcium tends to stimulate or seed further precipitation.

Since quantities of suspended materials can be tolerated in multi-cell systems which demineralize water on a large scale basis, several means have been disclosed in the art for reducing the effects of "concentration polarization." For example, it has been suggested on the one hand that the concentrated layers be broken-up in a non-turbulent manner by using layers of open-celled foam adjacent the membranes, U.S. Pat. No. 3,492,488 of 1970, while on the other hand it has been suggested that they be broken-up in a turbulent manner by increasing the turbulence of the rinsing flow through the electrode compartments, U.S. Pat. Nos. 2,784,157 of 1957 and 2,848,403 of 1958.

Scaling and precipitation have been combated by lowering the pH in the cathode rinsing compartment either by adding acid to the compartment or periodically the polarity reversing the polarity of the electrodes, U.S. Pat. No. 2,862,813 of 1958. Other suggested methods have been to make the distance between membranes and adjacent electrodes very close, U.S. Pat. No. 2,739,938 of 1956, and substituting membranes of less selectivity at locations where scaling develops, U.S. Pat. No. 2,981,671 of 1961.

The concentrated and polarized layers created by "concentration polarization" nevertheless cause insoluble mineral salts, such as calcium hydroxide and calcium carbonate, to contaminate the cathode compartment, and in large amounts these contaminates can rapidly block fluid flow through the compartments and cause an increase in the electrical resistance of the apparatus and necessitate high applied potentials. Thus, "concentration polarization" is the basic limiting factor in electrodialysis, and electrodialysis cannot be effectively used on a small scale basis for the demineralization of tap water unless "concentration polarization" can be controlled.

DESCRIPTION OF THE PREFERRED EMBODIMENT

Referring to FIG. 1 an electrodialytic demineralizing unit 10 operating on a low volume basis according to the present invention is mounted on the hot air plenum 12 of a furnace or the like. The unit consists of one or more "half-cells" or demineralizing cells each divided by a single cation-selective membrane into a demineralized product flow chamber having an anode therein and a waste purge flow chamber having a cathode therein.

In the preferred embodiment, the unit 10 includes a series of four permselective membranes 15 of the cation-selective type alternately interposed between a series of five rectangular-shaped blocks 16–20 preferably constructed of polymeric material, such as polyvinyl chloride or the like. For clarity, the blocks are transparent in the drawings. Gaskets are also interposed on each side of each membrane 15, but are not shown in the drawings. The unit 10 is thus comprised of four back-to-back "half-cells." However, it could as well have larger dimensions and consist of fewer cells, or smaller dimensions and more cells, depending on the furnace size, output requirements, etc., since deionization depends largely on the membrane area.

The cation-selective membranes 15 preferably consist of a polyethylene film impregnated with an ion-exchange material such as styrene-polyvinyl benzene, which is grafted onto the polyethylene base by exposure to radiation and converted to polyelectrolytes of sulfonic acid. Suitable cation-selective membranes are available from AMF Incorporated, Research Division, Stamford, Conn. 06707, under the trademark "AMFion." When placed in an ionic solution between electrodes connected to a DC source, they allow cations to pass, but prevent anions from passing through.

The unit is fastened together by fastener bolts 21 received through longitudinally extending bores 22 formed in the blocks 16–20 and openings 23 formed in the membranes 15 and gaskets (not shown). The bores 22 in the end blocks 16 and 20 are counterbored for receiving the heads of the bolts at one end and locking nuts at the other end, and the unit 10 is conveniently attached to a pair of vertically extending brackets 25 by two of the bolts 21. The brackets 25 are bolted to the plenum 12 through a sheet of insulating material (not shown) sandwiched between the plenum 12 and an overlying galvanized steel plate 26 also bolted or attached to the plenum 12.

A power cable 27 is connected to a housing 28 attached to the right-side of the unit 10 and provides power to electrical control apparatus contained therein, and an on-off switch 29 is mounted on the front surface of the housing 28 for starting and stopping operation of the unit.

Referring to FIGS. 1–6, a water inlet line 30 delivers tap water to a fitting 31 connected to a water inlet 32 formed in the surface of the end-block 20 near the bottom thereof. The water is delivered through a short lateral passage (FIG. 3) to a longitudinal passageway 35 (FIG. 6) formed by a series of aligned longitudinal openings in the respective membranes and gaskets and the bores in the respective blocks. A solenoid valve 37 is mounted within cavity 38 communicating with the lateral passage 34 and formed in the end surface 39 of the end-block 20 (FIG. 4). The valve 37 is adapted to intermittently interrupt and stop the flow of water through the unit by seating against a valve seat 40 molded directly within the passage 34.

From the longitudinal passageway 35 the water is delivered upwardly through a pair of elongated inlets 41 to a pair of spaced demineralized product flow chambers 42 formed in the spaced central blocks 17 and 19 and through three shortened inlets 43 to three spaced purge flow chambers 44 formed in the end-block 16, the center-block 18, and the end block 20 respectively.

The flow chambers 42 and 44 are generally rectangular in shape. To avoid the creation of stagnate areas during flow, the flow chambers 42 and 44 have smooth, rounded surfaces and corners, and the inlets 41 and 43 are gradually enlarged as they open into the flow chambers. The flow chambers in the central blocks 17–19 extend longitudinally through the blocks and communicate with the membranes 15 at each end thereof, while flow chambers in the end-blocks 16 and 20 are cup-like in shape and communicate with the adjacent membrane at one end and form end-walls 46 at the other end.

The unit 10 includes electrodes resistant to attack by products formed in the chambers. Vertical anodes 48 preferably consisting of tantalum mesh, or titanium mesh coated with a thin film of corrosion-resistant platinum, are disposed in each product flow chamber 42 and are especially resistant to acidic conditions. The anodes 48 are embedded at one end in a U-shaped polyvinyl alcohol bridge 50 heat welded across the inlets 41 to the bottom surface of the chamber, and have a tantalum or platinum-coated titanium support member 51 connected thereto and received within an opening 52 in the side wall of the chamber.

Disposed in each purge flow chamber 44 is a vertical cathode 54, each cathode preferably consisting of a pair of spaced-apart stainless steel rods 55 inserted into depressions in the bottom surface of each chamber 44 on each side of an inlet 43. A stainless steel cross-member 57 connects the rods 55, and a stainless steel support member 58 is connected to one of the rods and is received within an opening 59 in the side wall of the chamber. In the preferred embodiment, the support members 51 and 58 and the openings 52 and 59 are formed with mating tapers to form a water-tight seal with the respective flow chambers.

Figure 2:
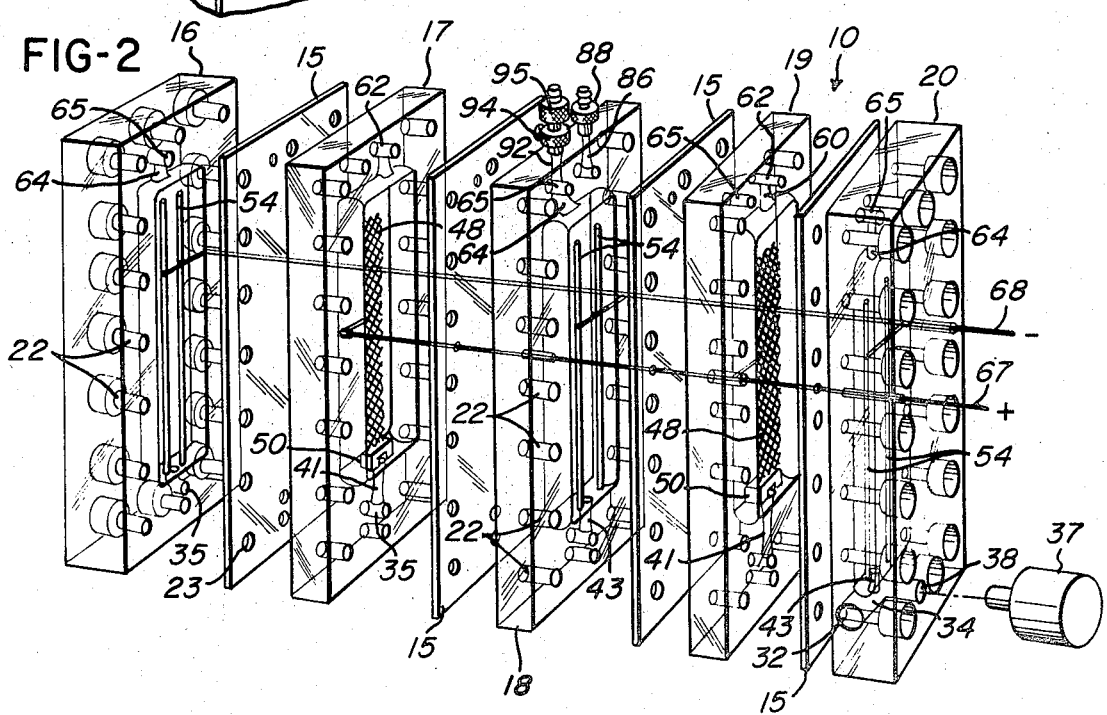
FIG. 2 is an exploded perspective view of the cation-selective membranes and the rectangular polymer blocks which define the flow chambers on each side of the membranes.

After entering into the flow chambers, the tap water flows in parallel and concurrent paths upward adjacent the electrodes (FIG. 7) and exits via outlets formed in the tops of the chambers. The water flowing through each purge flow chamber 44 passes into an outlet 64 communicating with a passageway 65 formed by openings within the blocks 16–20 on a forwardly disposed and off-center longitudinal axis (FIG. 2). Similarly, the water flowing through each product flow chamber 42 passes into an outlet 60 communicating with a passageway 62 parallel to passageway 65 and formed by openings within the central blocks 17–19 on a rearwardly disposed longitudinal axis. The outlets 60 and 64 also have smooth, gradually decreasing diameters to reduce the likelihood of stagnate flow.

The unit 10 demineralizes tap water when an electric potential is applied across the electrodes. The electrodes are connected to the power source by wires 67 and 68 disposed in passages 69 and 70 formed in the forward and rearward sides of the blocks 17–20 and 16–20 respectively (FIGS. 2–5). Wire 67 connects the anode support members 51 to the anode terminal 71 (FIG. 9), and wire 68 connects the cathode support members 58 to the cathode terminal 72.

The power cable 27 delivers 115 volts AC to the control apparatus contained within the housing 38 and, when the switch 29 is closed (FIG. 9), sends current through a fuse 74 to a transformer 75 which reduces the voltage to about 24 volts AC RMS. The alternating current is converted to direct current by a rectifier 77 and the direct current is filtered by a filtering capacitor 78 before it is delivered to the terminals 71 and 72 to establish an electrical connection between the electrodes and the power source.

Ionic migration begins once the potential is applied across the electrodes. First the calcium bicarbonate $Ca(HCO_3)_2$ splits into its ionic constituents, the calcium cation and the bicarbonate anion. These dissolved ions carry electrical charges and are influenced by the field, and the cations are pulled toward the purge flow chambers 44 by the cathodes 54 and the anions are pulled toward the product flow chambers 42 by the anodes 48 (FIG. 8).

The calcium cations are pulled out of the product flow chambers 42 and pass through the cation-selective membranes into the purge flow chambers 44. Since an anion-selective membrane is not used, the bicarbonate anions attracted by the anodes 48 are blocked by the cation-selective membrane 15 and build up acidic films 80 (FIG. 8) on the cathode sides thereof within the purge chambers 44.

The adverse effects "concentration polarization," discussed above, are substantially overcome by the present invention because there is only slight scaling and precipitation within the purge flow chambers 44 over an extended period of time, for example, on the order of 800 hours of operation. This surprising result follows from the elimination of the anion-selective membrane and is believed to result in the following activity.

As the calcium cations meet the membranes 15 they momentarily build up in a slightly concentrated alkaline film 81 and then move relatively slowly through the membrane until they meet the acidic film 80 formed by the bicarbonate anions. Simultaneously, electrolysis occurs and creates oxygen gas and positively charged hydronium cations at the anodes 48 and hydrogen gas and negatively charged hydroxyl anions at the cathodes 54. The acidic film 80 prevents the incoming calcium cations from combining with the plentiful hydroxyl anions on the surfaces of the membranes 15, and thereby prevents the damaging calcium hydroxide $Ca(OH)_2$ scale from forming on the membrane.

Prevention of scaling on the membrane effectively increases the service life of the unit. In the process, however, the alkalinity of the hydroxyl anions increase the pH of the purge chambers 44. Since the dissolved calcium bicarbonate $Ca(HCO_3)_2$ is sensitive to a high pH, the hydroxyl ions strip hydrogen ions from the bicarbonate anions and form carbonate anions, some of which eventually combine with calcium cations to form a calcium carbonate $CaCO_3$ precipitate.

The unit 10 therefore includes several features designed to minimize the effects of the precipitation of $CaCO_3$. The smooth surfaces of the flow chambers and of their inlets and outlets effectively eliminate stagnate areas in which a particle of $CaCO_3$ precipitate can seed further precipitation. In addition, each purge flow chamber 44 (FIG. 6) has a relatively deep precipitate reservoir 82 formed with steeply tapered walls 84 and adapted to collect over an extended period of operating time the $CaCO_3$ precipitate which is not carried away by the upward purge flow and which builds up at the base of the membrane 15.

Another feature is that the hydrogen gas forms in bubbles around the cathodes 54, and these bubbles (FIG. 8) prevent precipitate from forming on the cathodes, as they are carried upwardly by the purge flow. Gas bubbles produced by electrolysis have been used in other applications to scavenge membrane surfaces, such as in the sewage treatment process of U.S. Pat. No. 3,562,137 of 1971, which shows a "half-cell" type of arrangement. Here, the oxygen and hydrogen bubbles created at the electrodes pass through the outlets 60 and 64 and are carried from the outlet by the upward flow of the product and purge streams.

In the preferred embodiment, the unit 10 is also provided with means for periodically reversing the polarity of the electrodes for short periods of time to create a periodic acid condition in the purge flow chambers 44, for the purpose of combating precipation under alkaline conditions. Reversed polarity also creates a periodic alkaline condition in the product flow chambers 42 to minimize the corrosive acid condition therein.

This is accomplished by a timer T operatively connected within the circuit (FIG. 9) periodically to close a cam switch Ts. In preferred practice, the timer T closes the switch Ts every eight hours for a period of about three minutes. When the cam switch Ts closes, it actuates a triple-pole double-throw relay R having three poles $P_1$–$P_3$. Pole $P_1$ is normally closed and maintains the solenoid valve in an open position to permit tap water to flow into the unit under normal operation. Poles $P_2$ and $P_3$ constitute a reversible double-pole double-throw switch located at the terminals 71 and 72 of the unit.

When the relay R is actuated by the cam switch Ts it opens pole $P_1$ and shuts off the flow of tap water through the unit by cuting off current to the solenoid causing the valve 37 to seat against the valve seat 40. The relay R also reverses the poles $P_2$ and $P_3$ to reverse the terminals 71 and 72 and thereby reverse the polarity of the electrodes. When the switch Ts opens, the relay R is deenerized and current is reestablished to the solenoid to open the valve 37 and reestablish flow of tap water through the unit. The relay R also switches the poles $P_2$ and $P_3$ back to their normal positions to reestablish a demineralizing field across the membranes 15.

The demineralized product formed in the product flow chambers 42 is delivered from the longitudinal passage 62 in the blocks 16–20 through a single port 86 (FIG. 2) formed in the top of center-block 18 and exits from the unit through a fitting 88. The product is then conveyed to a stainless steel atomizing nozzle 90 disposed within the plenum 12 through tubing 91 or the like where it is sprayed directly into the hot air passing through the plenum 12. The purge streams, on the other hand, are delivered from the passage 65 through another port 92 in the center-block 18 and exit from the unit through tubing 93 connected to a fitting 94 containing a restricting orifice 95 for balancing the pressure within the unit 10 with the pressure created by the nozzle 90. The tubing 93 delivers the purge stream to a drain or the like. A conventional siphon break (not shown) is used on drain line 93 to prevent siphoning action when unit is not operating.

The unit shown in the drawings is conveniently adapted to produce about 1 gallon of demineralized tap water per hour for home use. At this rate, it has been found to reduce the calcium cation constituent present in normal water and ranging from 100 ppm to 400 ppm to below 20 ppm, and therefore substantially reduces the solid residue sprayed into the furnace. At a slower flow rate, for example three-eighths gal/hr, the calcium cation constituent was reduced to 5 ppm and below. When the demineralized water evaporates, the bicarbonate anions remaining in the product water decompose into carbon dioxide, a harmless and odorless gas which is not dangerous in the home, especially at low rates of production.

It should be pointed out that the unit 10 demineralizes softened tap water in addition to conventional tap water, described in detail herein. In the case of softened water, since water softening units ususally replace the calcium and other hard water cations with sodium cations, the unit 10 removes sodium ions from the product streams instead of the calcium and other hard water cations.

From the foregoing description and accompanying drawings it is apparent that a demineralizing unit constructed in accordance with the present invention provides certain desirable features and advantages. The unit provides a means for demineralizing tap water which is simple in design yet economical to produce. It produces demineralized water on a relatively low volume basis. The product may be used for humidification purposes generally, such as by use of wetted porous contact evaporation, and may also be used in the home for purposes of obtaining demineralized water where distilled water is needed.

More importantly, however, the invention substantially overcomes the "liming" and dusting problems and provides a humidifier consisting of an electrodialytic demineralizing unit which can be conveniently attached to the air plenum of a furnace to deliver water to an atomizing nozzle for spraying a mist of water into the hot air. The unit accomplishes this result without the requirement for regeneration. This is a significant advance in the humidification art.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A humidifier operable to delime and demineralize tap water and to dispense it into a furnace comprising at least one electrodialytic "half-cell" unit having means defining a cavity therein, at least one cation-selective membrane in said cavity dividing said cavity into at least one purge flow chamber and at least one product flow chamber, inlets into said chambers, outlets from said chambers, means for delivering tap water to said inlets to establish product and purge streams through said product and purge chambers to said outlets, an anode disposed in said product chamber, a cathode disposed in said purge chamber, means for applying an electric potential across said electrodes to pull the cation constituent of lime in said product stream through said cation-selective membrane and into said purge stream to thereby delime and demineralize said product stream, said unit being formed with smooth internal surfaces on said cavity and on said inlets and outlets to prevent stagnate flow areas from developing therein, means for periodically interrupting and stopping the flow of tap water through said unit, means for reversing the polarity of said electrodes to control the pH within said chamber, an atomizing nozzle disposed in a wall of said furnace, and means for delivering said product stream to said nozzle for dispensation in the form of a fine spray into said furnace.

* * * * *